Nov. 14, 1967  J. R. MECREDY ET AL  3,352,462
COOKING APPARATUS

Filed May 27, 1966  3 Sheets-Sheet 1

INVENTORS
JAMES R. MECREDY
ROBERT M. WOLAVER
BY
*Jeare, Jeare & Sansom*
ATTORNEYS

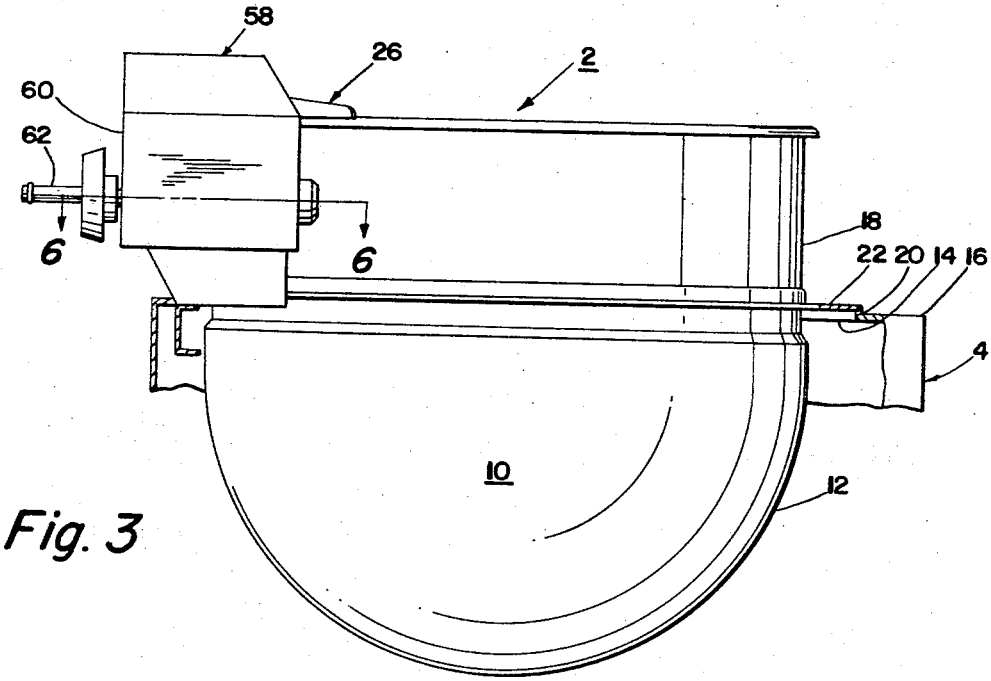
Fig. 3
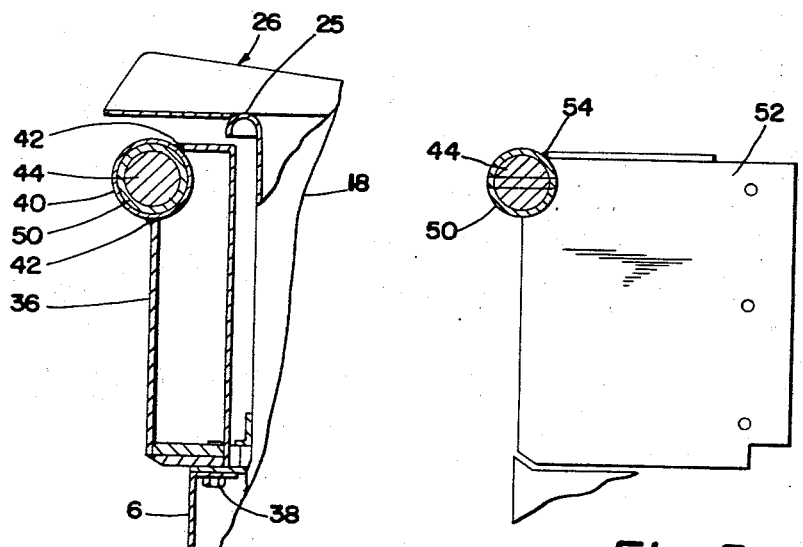
Fig. 4
Fig. 5
INVENTORS
JAMES R. MECREDY
ROBERT M. WOLAVER
BY
*Isare, Isare & Sammon*
ATTORNEYS United States Patent Office 3,352,462
Patented Nov. 14, 1967

3,352,462
COOKING APPARATUS
James R. Mecredy, Lakewood, and Robert M. Wolaver, South Euclid, Ohio, assignors to The Cleveland Range Company, Cleveland, Ohio, a corporation of Ohio
Filed May 27, 1966, Ser. No. 553,394
17 Claims. (Cl. 222—166)

ABSTRACT OF THE DISCLOSURE

An apparatus for handling and/or preparing relatively large batches of food items including a frame and a kettle attached by a pivotal connection to the frame for rotational movement about a horizontal axis. A drive gear mechanism mounted on top of the frame and laterally to one side of the kettle and coupled to the pivotal connection for rotating the kettle about the horizontal axis.

---

This invention relates to apparatus for preparing foods and the like, and more particularly relates to an improved construction for a kettle tilting mechanism of the type employed in tilting a kettle forwardly from its upright position into a prone position for discharging the contents therefrom and, thereafter, backwardly into its upright position.

Heretofore, various methods have been employed for operating a tiltable kettle of the type employed in preparing foods, particularly in large quantities. One such method has incorporated an intricate link-arm and pulley arrangement actuated by foreshortening one or more flexible elements. Such arrangements are not only space consuming and cumbersome to operate, but fail to provide a constant mechanical advantage and operating speed over the entire range of movement of the kettle and consequently require the use of auxiliary counter-balancing equipment, particularly when handling heavy loads. In addition, because of its bulky construction, such arrangements have usually been disposed in a cabinet below the kettle where they are subject to mechanical fouling because of the presence of dirt and the like. In addition, such arrangements make service and/or replacement of the component parts extremely difficult. Another more recent method has incorporated a screw actuated elevating lever which engages a roller mounted on the underside of the kettle for tilting the same upon rotation of the screw. Such arrangement, however, has not been found to provide a constant mechanical advantage and speed over the entire range of movement of the kettle. Such arrangement has required the use of auxiliary equipment, such as brakes, clutches, rachet devices and the like, to prevent over-balancing effects under load and has usually required the use of counter-balancing devices to off-set part of the load during operation. Here again, the space requirements of such arrangement has usually required the mechanism to be positioned in a cabinet below the kettle where it is subject to mechanical fouling, and where replacement of the component parts is extremely difficult.

In addition, heretofore known arrangements have generally required the use of movable tray devices operative in response to tilting of the kettle in order to provide a receptacle for receiving its contents. Such devices are not only costly to produce and maintain, but are space consuming and time consuming to operate.

Accordingly, an object of the present invention is to provide an improved construction for a kettle tilting mechanism which overcomes the aforementioned and other related disadvantages of heretofore known types of tilting devices, which is of a compact precision construction for smooth, uniform tilting of the kettle, which provides an improved constant mechanical advantage over the entire range of tilting movement of the kettle, which provides a constant speed of kettle tilt over the entire range of movement regardless of the amount of cranking and/or position of the kettle, which provides a constant, uniform metering of fluid material, which eliminates the need for movable tray devices or the like, which may be installed and lubricated, as a unit, for ready repair and/or interchangeability, which substantially eliminates mechanical fouling of the component parts during operation, which is readily accessible for service and/or replacement of the component parts and with a minimum of time and effort, which is constantly lubricated and sealed from the contents of the kettle and the ambinet atmosphere which reduces the need for auxiliary counter-balancing equipment and/or other auxiliary equipment heretofore necessary to prevent over-balancing of the kettle under load, and which substantially reduces wear on the component parts, particularly under heavy loads.

Other objects and advantages of the invention will be apparent from the following description taken in conjunction with the accompanying drawings wherein:

FIG. 3 is a fragmentary side elevation view of the tiltable kettle and tilting mechanism corresponding to FIG. 1;

FIG. 4 is a vertical section view taken along the plane of line 4—4 of FIG. 1;

FIG. 5 is a vertical cross-section view taken along the plane of line 5—5 of FIG. 1;

Figures 1, 2:
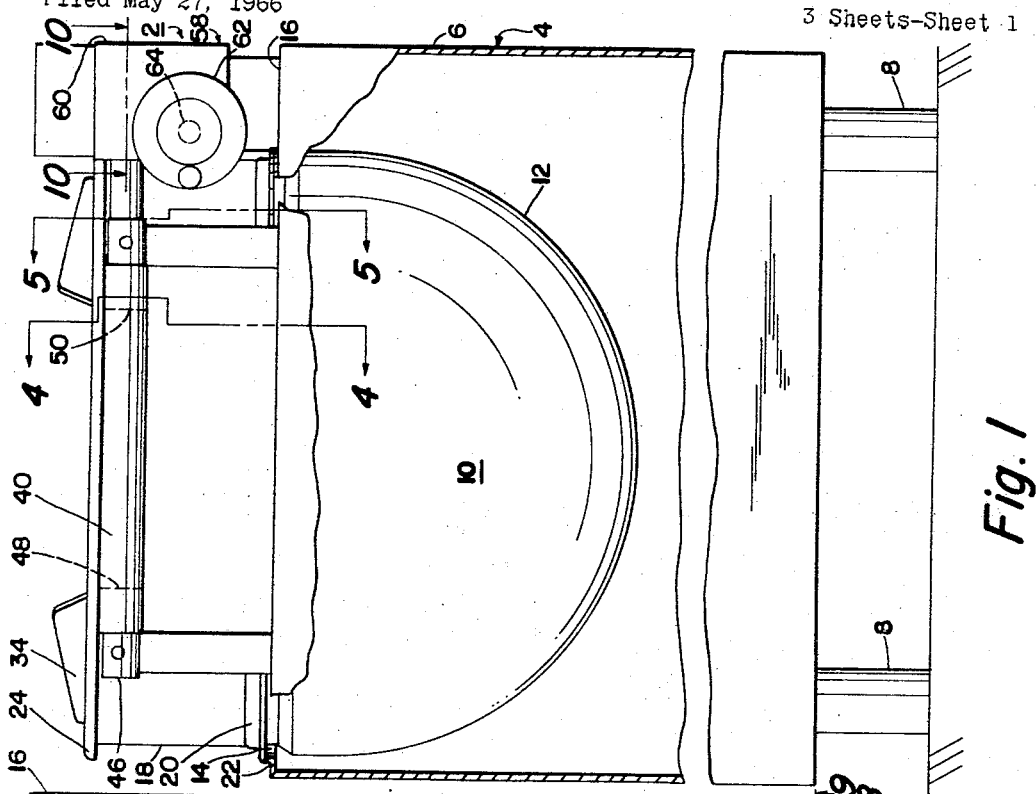
FIG. 1 is a broken elevation view, partly in section, of a kettle supported for tilting movement about a horizontal axis upon actuation of the tilting mechanism of the present invention.
FIG. 2 is a top plan view of the tiltable kettle and tilting mechanism corresponding to FIG. 1.

Referring again to the drawings and in particular to FIGS. 1 to 3 thereof, the cooking device, designated generally at 2, is shown mounted in an upright position on a cabinet 4. The cabinet 4 may include a suitable polygonal, such as rectangular, frame 6 mounted on pedestal legs 8. As shown, the device includes a kettle 10 having a lower semi-spherical portion 12 disposed through an opening 14 in the top wall 16 of the frame 6. To the lower portion 12 may be integrally attached an upper cylindrical portion 14 which forms a continuation thereof. It is to be noted, however, that the kettle 10 may be of any convenient size and/or shape, as desired. An annular ring 20 may be integrally attached to the kettle 10 adjacent the juncture between lower 12 and upper 18 portions which is adapted for engagement on an annular flange 22 disposed adjacent the opening 14 in the top wall 16. This arrangement provides an effective barrier seal between the kettle 10 and the cabinet 14 in its upright position, thereby to prevent the contents of the kettle from entering the cabinet.

The upper cylindrical portion 18 may include an inverted generally U-shaped annular rim 24 which defines the open top of the kettle 10. To the rim 24 which may be attached, such as by weldments 25 (FIG. 4), a pouring spout 26. As shown in FIGS. 1 and 2, the spout 26 includes a planar base 28 having a linear front edge 30 and a curved or semi-circular rear edge 32 which corresponds in contour to that of the rim 24. A pair of side flanges 34 may be bent upwardly from the base 28 and extend convergently toward one another in a direction away from the rear edge 32. As best shown in FIG. 1, the side flanges 34 may be tapered so as to increase progressively in height from the rear edge 32 toward the front edge 30. By this arrangement, there is provided optimum flow characteristics for delivering the contents of the kettle 10 upon tilting of the same to a prone position into a suitable receptacle without spillage thereof.

The kettle 10 may be mounted for forward and backward tilting movement relative to the cabinet 4 on a polygonal, such as rectangular, housing 36 (FIG. 4) attached by bolts 38 to the frame 6. A horizontally disposed sleeve 40 of stainless steel or the like may be fixed attached, such as by weldments 42, to the housing 36. As best seen in FIG. 4, a driven shaft 44 may be journaled for rotation within the sleeve 40 by a pair of axially spaced bearings 48 and 50 (FIG. 1). The kettle 10 is connected for rotation with the shaft 44 by a pair of bracket plates 52 fixedly attached, as at 54 (FIG. 5), to the shaft casing 46 and to the upper cylindrical portion 18 of the kettle 10, as at 56 (FIG. 2). By this arrangement, upon rotation of the shaft 44 in one direction, the kettle 10 may be tilted forwardly out of the opening 14 until the rim 24 is disposed in perpendicular relationship relative to the top wall 16 of the frame 6, and then backwardly into the upright position shown upon rotation of the shaft 44 in the opposite direction, as will hereinafter be more fully described.

Figure 6:
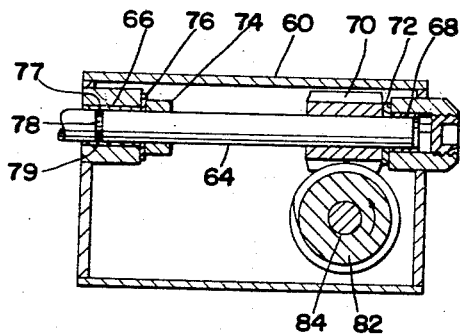
FIG. 6 is a horizontal cross-section taken along the plane of line 6—6 of FIG. 3.
Figure 10:
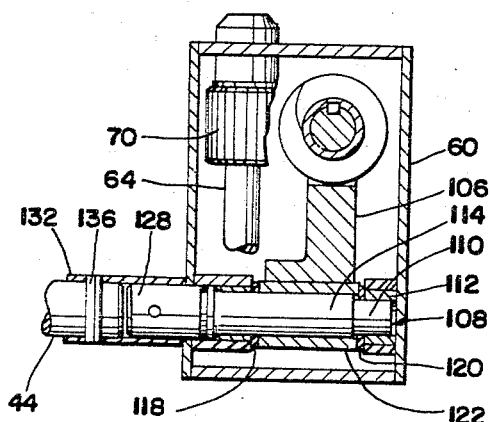
FIG. 10 is a horizontal cross-section taken along the plane of line 10—10 of FIG. 1.

Now in accordance with the invention, the mechanism for tilting the kettle 10, designated generally at 58, includes an exteriorily mounted gear box or housing 60 which may be disposed forwardly and adjacent the right-hand corner of the frame 6, as seen in FIGS. 1 and 2. As shown, the mechanism 58 includes a crank handle 62 mounted on one end of a horizontally disposed drive shaft 64 which extends interiorily into the gear box 60 and which is rotatably journaled therein by a pair of axially spaced bearings 66 and 68, as seen in FIG. 6. The housing 60 may be mounted, however, on either side and driven by a suitable motor means (not shown) disposed at any convenient location, as desired. The shaft 64 may be disposed perpendicular to and below the rotational axis of the aforementioned driven shaft 44 which tiltably mounts the kettle 10, as best seen in FIGS. 1 and 10. The bearings 66 and 68 are preferably made from an anti-friction material, such as bronze or the like. A worm gear 70 is fixedly mounted adjacent the inner end of the shaft 64 and a thrust plate 72 comprised of an anti-friction material, such as bronze, is disposed between the worm gear 70 and the bearing 68. In the embodiment shown, the worm gear 70 is preferably an i-pitch single thread worm. To prevent axial movement of the shaft 64, a suitable locking device, such as a set screw collar 74 may be disposed thereon and another thrust plate 76 disposed between the collar 74 and the bearing 66.

To provide a fluid seal between the shaft 64 and the gear box 60, a resilient sealing element 77, such as an O-ring, may be disposed in an annular slot 78 provided on the shaft 64. A bushing 79 such as of soft steel, may be disposed around the sealing element 77 and between the shaft 64 and the confronting surface of the bearing 66. The other bearing 68 may be provided with a threaded plug 80 to facilitate entrance into the interior of the gear box 60.

Figure 8:
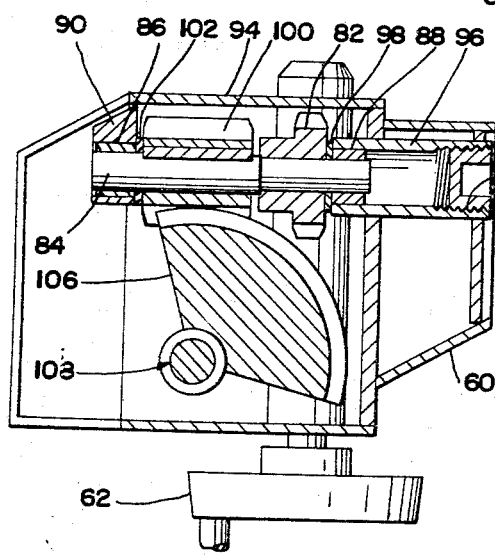
FIG. 8 is a horizontal cross-section view taken along the plane of line 8—8 of FIG. 2.

The worm gear 70 is disposed for meshing engagement with another worm gear 82 mounted on a vertically disposed companion shaft 84, as best seen in FIGS. 6 and 8. In the embodiment shown, the worm gear 82 is preferably an 8-pitch 20 tooth worm. The gear ratio between the worm 70 and the worm 82 is preferably about 20:1. The shaft 84 is journaled in vertically spaced bearings 86 and 88, the former of which is mounted within a bracket plate 90 attached to the gear box frame 94, and the latter of which is mounted within a cylindrical sleeve 96 attached to the frame 94. A thrust plate 98 comprised of an anti-friction material, such as bronze, may be disposed between the worm gear 82 and the bearing 88. Another worm gear 100 may be fixedly mounted on the shaft 84 in axially spaced relation relative to the worm gear 82 (FIG. 8). In the embodiment shown, the worm gear 100 is preferably a 6-pitch double thread worm. Another thrust plate 102 may be disposed between the worm gear 100 and the bearing 86. The outer end of the sleeve 96 may be provided with another threaded plug 104 to provide ready accessibility to the interior of the gear box 60.

Figure 7:
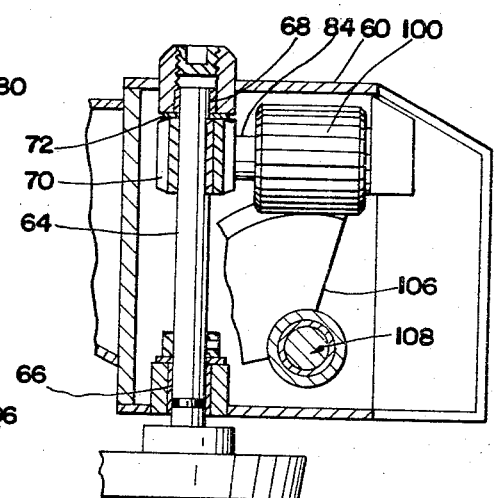
FIG. 7 is a horizontal cross-section view taken along the plane of line 7—7 of FIG. 2.

As best shown in FIGS. 7, 8 and 10, the worm gear 100 is disposed for meshing engagement with a segment gear 106 fixedly mounted on a horizontally disposed driven shaft 108. The drive shaft 108 has a reduced diameter portion 110 (FIG. 10) journaled in a bearing 112 and an integral larger diameter portion 114 journaled in another axially spaced bearing 116. A pair of thrust plates 118 and 120 (FIGS. 9 and 10) may be disposed the respective bearings 112, 116 and an annular collar 122 which mounts the segment gear 106 on the shaft 108. To seal the gear box 60 with the shaft 108 an annular slot 124 may be provided between an integral, annular flange 126 and a maximum diameter portion 128 of the shaft into which may be fitted a resilient sealing element 130, such as an O-ring. In the embodiment shown, the segment gear 106 is preferably a 6-pitch 40 tooth segment having a toothed radius of about 120°. By this arrangement, the kettle 10 can be tilted from the upright position (FIGS. 1 to 3) through about 90° into a prone position for discharging the contents therefrom. The gear ratio between the worm gear 100 and the segment gear 106 is preferably about 20:1 so that the overall gear ratio of the mechanism is about 400:1. By this arrangement, the crank handle 62 may be rotated about 100 turns to achieve a 90° tilting of the kettle. This arrangement provides a constant mechanical advantage as well as a constant speed of tilt over the entire range of movement of the kettle 10. It is to be understood, however, that other gear ratios may be advantageously employed for tilting larger or smaller size kettles, as desired. For example, a gear ratio of about 400:1 is preferred for instance in tilting a kettle having a load capacity of about 30 to 40 gallons while a 200:1 ratio would be sufficient for about a 20 gallon capacity, and a ratio of 800:1 would be sufficient for over a 40 gallon and up to about a 60 gallon capacity.

In the embodiment shown, a suitable lubricating media may be introduced into the gear box 60 so as to provide a constantly lubricated torque converter. This arrangement maintains a smooth, precision operation of the component parts and prevents any contamination from the kettle contents during operation of the tilting mechanism.

Figure 9:
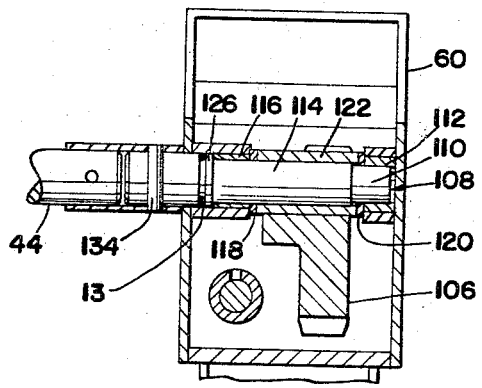
FIG. 9 is a horizontal cross-section view taken along the plane of line 9—9 of FIG. 2.

As best seen in FIGS. 9 and 10, the output end of the driven shaft 108 may be operably connected to the adjacent end of the driven shaft 44 which tiltably mounts the kettle 10 by means of a coupling sleeve 132. The sleeve 132 may be connected at one end to the shaft 108 by a cross pin 134 (FIG. 9) and at its other end to the shaft 44 by another cross-pin 136 (FIG. 10) thereby to provide a driving connection between the kettle 10 and the tilting mechanism 58.

The frame 6 of the cabinet 4 provides a jacket around the lower semi-spherical portion 12 of the kettle 10 so that the kettle may be heated by a suitable heating media, such as steam or the like. Moreover, steam may be introduced through suitable conduits (not shown) into the cabinet while condensate may be discharged from the cabinet by similar conduits (not shown).

From the foregoing description and accompanying drawings, it will be seen that the present invention provides an improved construction for a tilting mechanism for tilting kettles and the like which is of a compact, rugged construction to provide maximum utilization of space which is mounted completely exteriorly of the cabinet so as to be free from contamination by dirt or the like and which is readily accessible for service and/or replacement. The mechanism is efficient and provides an appreciable mechanical advantage that is constant over the entire range of movement of the kettle which reduces the need for auxiliary counter-balancing equipment during operation thereof. In addition, the kettle can be tilted at a constant speed over its entire range of movement regardless of any amount of cranking of the handle 62 and the position of the kettle 10. Moreover, the kettle can be tilted about a horizontal axis in a manner so as to eliminate the need for movable trays and the like heretofore necessary for receiving the poured contents therefrom.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

We claim:

1. In a cooking apparatus for handling and/or preparing relatively large quantities of food items or the like, said apparatus comprising a support frame, a kettle having an open top portion and a closed lower portion, pivot means operably connecting the kettle wall adjacent the upper top thereof, to the top of the frame for pivotal movement of the kettle about a horizontal axis, said frame being of a generally hollow construction with the top portion of the kettle projecting upwardly therefrom and with the lower portion of the kettle projecting downwardly within said frame, and a generally self-contained drive gear mechanism mounted adjacent the top of said frame and entirely above the lower portion of said kettle, said drive gear mechanism being disposed laterally adjacent one side of said pivot means and operably connected thereto for pivoting the kettle from a generally vertically oriented position into a generally horizontally oriented position about said horizontal axis for discharging the contents therefrom, whereby a substantially constant mechanical speed is imparted to the kettle throughout its entire range of pivotal movement thereof.

2. In a cooking apparatus in accordance with claim 1, wherein said drive mechanism includes a horizontally disposed drive shaft disposed below and extending at an angle with respect to said pivot means, a driven shaft disposed in alignment with and operably coupled to said pivot means, and gear means operably connecting said drive shaft to said driven shaft.

3. In a cooking apparatus in accordance with claim 1, wherein said drive mechanism includes a box-like housing, a drive shaft journaled horizontally in said housing and disposed at an angle with respect to said pivot means, first gear means mounted on and for rotation with said drive shaft, a generally vertically oriented companion shaft journaled in said housing, second gear means mounted on and adapted for rotating said companion shaft upon engagement with said first gear means, a driven shaft journaled horizontally in said housing, said driven shaft disposed in alignment with and operably coupled to said pivot means, and third gear means mounted on and adapted for rotating said driven shaft upon meshing engagement with the second gear means on said companion shaft.

4. In a cooking apparatus in accordance with claim 1, including a pouring spout attached to and extending outwardly adjacent the open top portion of said kettle, said spout including a base extending outwardly slightly beyond said pivot means, and a pair of spaced, oppositely disposed side walls extending upwardly from said base and extending convergently toward one another in a direction toward said pivot means.

5. In a cooking apparatus in accordance with claim 3, wherein said housing is of a hollow, closed construction, and inlet means in said housing for introducing a lubricating media therein for self-lubricating said gear means.

6. In a cooking apparatus in accordance with claim 2, wherein said gear means includes at least one worm gear providing a driving connection between said drive shaft and said driven shaft.

7. In a cooking apparatus in accordance with claim 2, wherein said gear means includes a worm gear on said drive shaft and a gear member on said driven shaft.

8. In a cooking apparatus in accordance with claim 7, wherein said gear member is a gear segment.

9. In a cooking apparatus in accordance with claim 8, wherein said gear segment has a toothed radius sufficient to provide tilting of the kettle through an angle of at least 90°.

10. In a cooking apparatus in accordance with claim 2, including a companion shaft disposed adjacent and at an angle relative to said drive shaft and said driven shaft, and said gear means operably interconnecting said drive shaft with said companion shaft, and said companion shaft with said driven shaft.

11. In a cooking apparatus in accordance with claim 10, wherein said gear means includes a worm gear on said drive shaft adapted for coacting engagement with another worm gear on said companion shaft, and the worm gear on said companion shaft adapted for driving said driven shaft.

12. In a cooking apparatus in accordance with claim 11, wherein said companion shaft includes another worm gear adapted for coacting engagement with a gear member on said driven shaft.

13. In a cooking apparatus in accordance with claim 12, wherein said gear member is a segment gear.

14. In a cooking apparatus in accordance with claim 1, wherein said pivot means for the kettle includes a sleeve attached to said frame, a driven support shaft disposed for rotation in said sleeve, and support means connecting said kettle to said supporting shaft for pivotal movement of the kettle about said horizontal axis upon rotation of said supporting shaft.

15. In a cooking apparatus in accordance with claim 3, including a pair of bearing means journaling said first shaft within said housing, adjustable locking means disposed around said first shaft adjacent one of said bearing means, a thrust bearing means disposed between said adjustable locking means and one of the bearing means, and another thrust bearing means disposed between said outer bearing means and said first gear means.

16. In a cooking apparatus in accordance with claim 3, including a pair of bearing means journaling said second shaft within said housing, a thrust bearing means disposed between said second gear means and one of said bearing means, and another thrust bearing means disposed between said third gear means and said other bearing means.

17. In a cooking apparatus in accordance with claim 3, including a pair of bearing means journaling said drive shaft within said housing, a thrust bearing means disposed between one of said bearing means and said fourth gear means, and another thrust bearing means disposed between said fourth gear means and said other bearing means.

References Cited

UNITED STATES PATENTS

| | | | |
|---|---|---|---|
| 1,214,617 | 2/1917 | Ulvig | 248—142 X |
| 1,606,400 | 11/1926 | Cheney | 248—142 X |
| 2,644,743 | 7/1953 | Clevenger | 248—139 X |
| 3,119,530 | 1/1964 | Swanson | 222—166 |

FOREIGN PATENTS

| | | |
|---|---|---|
| 349,838 | 6/1931 | Great Britain. |

CHANCELLOR E. HARRIS, *Primary Examiner.*